United States Patent
Dickerson

(10) Patent No.: US 7,040,299 B2
(45) Date of Patent: May 9, 2006

(54) FUEL SYSTEM

(75) Inventor: Steven J. Dickerson, Lake In The Hills, IL (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 103 days.

(21) Appl. No.: 10/837,077

(22) Filed: Apr. 30, 2004

(65) Prior Publication Data

US 2005/0241622 A1 Nov. 3, 2005

(51) Int. Cl.
*F02M 37/00* (2006.01)

(52) U.S. Cl. .................. 123/510; 123/514; 123/457

(58) Field of Classification Search ............ 123/510, 123/511, 514, 457, 509, 549, 557
See application file for complete search history.

(56) References Cited

U.S. PATENT DOCUMENTS

| | | | | |
|---|---|---|---|---|
| 4,051,031 A | * | 9/1977 | Suzuki | 210/133 |
| 4,570,604 A | * | 2/1986 | Thornton et al. | 123/514 |
| 4,617,116 A | * | 10/1986 | Seiler | 210/137 |
| 4,933,093 A | * | 6/1990 | Keller | 210/774 |
| 5,078,167 A | * | 1/1992 | Brandt et al. | 137/549 |
| 5,195,494 A | * | 3/1993 | Tuckey | 123/514 |
| 5,269,276 A | * | 12/1993 | Brown | 123/514 |
| 5,425,342 A | * | 6/1995 | Ariga et al. | 123/456 |
| 5,626,121 A | * | 5/1997 | Kushida et al. | 123/514 |
| 5,692,479 A | * | 12/1997 | Ford et al. | 123/514 |

OTHER PUBLICATIONS

International Truck and Engine Corporation, "VT 365 2002 Model Year—Features Descriptions and Unique Service Procedurcs," TMT-3408, 2001, pp. 26-27, U.S.A.

* cited by examiner

*Primary Examiner*—Thomas Moulis
(74) *Attorney, Agent, or Firm*—Dennis Kelly Sullivan; Susan L. Lukasik; Jeffrey P. Calfa

(57) ABSTRACT

A fuel system for a diesel engine may have a fuel tank, a fuel pump, a fuel filter module, and a fuel rail. The fuel filter module has a vacuum side and a pressure side. The vacuum side is connected to the fuel tank and to the inlet side of the fuel pump. The pressure side is connected to the outlet side of the fuel pump and to the fuel rail. The fuel filter module has a pressure regulator and a filter element in the pressure side. The pressure regulator is disposed between the outlet side of the fuel pump and the filter element. The pressure regulator recirculates unfiltered fuel to the vacuum side of the fuel filter module.

12 Claims, 6 Drawing Sheets

FUEL SYSTEM

FIELD OF THE INVENTION

This invention generally relates to fuel systems for internal combustion engines. More particularly, this invention relates to fuel systems that pressurize and filter fuel for diesel engines.

BACKGROUND OF THE INVENTION

Diesel engines convert chemical energy from a fuel into mechanical energy. The fuel usually is petroleum-based. Most diesel engines compress air in a cylinder and then inject fuel into the cylinder for the compressed air to ignite. The ignited fuel generates rapidly expanding gases that actuate a piston in the cylinder. The piston usually is connected to a crankshaft or similar device for converting the reciprocating motion of the piston into rotational motion. The rotational motion from the crankshaft may be used to propel a vehicle, operate a pump or an electrical generator, or perform other work. The vehicle may be a truck, an automobile, a boat, or the like.

Many diesel engines use a fuel injection system to inject fuel into the cylinders. Fuel injection systems usually have fuel injectors that spray a measured amount of fuel into each cylinder. The fuel pressure typically is increased for injecting the fuel near or at the end of the compression cycle. Most fuel injectors are activated mechanically or hydraulically and may be electronically controlled. Some diesel engines use hydraulically activated electronically controlled unit injection (HEUI) fuel system to inject fuel into the cylinders. HEUI fuel injectors usually inject fuel into the cylinders at a pressure in the range of about 15,000 psi (103 MPa) through about 25,000 psi (172 MPa).

Most diesel engines have a fuel system to provide fuel to the fuel injectors. The fuel system usually has a fuel line that interconnects a fuel tank, a fuel pump, a pressure regulator, a primary filter, and a fuel rail. The fuel system may have other components between the fuel tank and the fuel pump such as a fuel heater, a coarse filter or strainer, and a water separator. The fuel system may have other components.

Most vehicles have the fuel tank outside the engine compartment. Many vehicles have the remaining components of the fuel system inside the engine compartment. Some vehicles have a filter, a pump, and other components in or near the fuel tank. Some fuel supply components like the fuel rail are mounted on or are part of the engine.

The fuel tank is connected to the inlet side of the fuel pump. In operation, the pump generates low pressure or a vacuum on the inlet side for fuel to flow from the fuel tank to the fuel pump. The fuel may pass through the fuel heater, the coarse filter or strainer, and the water separator on the way to the fuel pump. The fuel heater usually has an electric heating element to raise the fuel temperature. The fuel heater may use engine coolant to raise the temperature. The coarse filter or strainer removes large contaminants from the fuel. The water separator removes water form the fuel. The coarse filter and the water separator may be integrated into the same component.

The fuel pump provides pressurized fuel to the primary filter. The primary filter removes smaller contaminants from the fuel. The primary filter provides filtered or cleaned fuel to the fuel rail or reservoir on the engine. The pressure regulator controls fuel pressure from the outlet side of the fuel pump. The pressure regulator usually is located after the primary filter. The pressure regulator recirculates fuel to the fuel tank via a fuel return line.

The fuel return line from the pressure regulator to the fuel tank may increase the costs and complexity of the engine. The return of filtered fuel to the fuel tank may decrease the service life of the primary filter and other components in the fuel system. The filtered fuel, once mixed with the fuel in the fuel tank, usually needs to be filtered again. The fuel pump may not operate efficiently and may fail when a plugged fuel filter causes the pressure to increase on the outlet side of the fuel pump.

SUMMARY

This invention provides a fuel system for a diesel engine. The fuel system has a fuel filter module that recirculates unfiltered fuel to the inlet side of a fuel pump.

A fuel system for a diesel engine may have a fuel tank, a fuel pump, a fuel filter module, and a fuel rail. The fuel pump has an inlet side and an outlet side. The inlet side is connected to the fuel tank. The fuel filter module has a pressure regulator and a filter element. The filter element is connected to the outlet side of the fuel pump. The pressure regulator is disposed between the outlet side of the fuel pump and the filter element. The pressure regulator recirculates unfiltered fuel to the inlet side of the fuel pump. The fuel rail is connected to the filter element.

A fuel filter module for a fuel system in a diesel engine may have a housing, a strainer, a filter element, and a pressure regulator. The housing forms a vacuum side and a pressure side. The vacuum side has a first inlet and a first outlet. The pressure side has a second inlet and a second outlet. The housing forms a first fuel passage that is connected to the first inlet. The housing forms a second duel passage that is connected to the first outlet. The strainer is connected to the first and second fuel passages in the vacuum side. The filter element is disposed in a filter chamber formed by the housing in the pressure side. The filter chamber is connected to the second inlet. The pressure regulator is connected to the filter chamber in the pressure side. The pressure regulator is disposed between the second inlet and the filter element. The pressure regulator is connected to the first fuel passage in the vacuum side. The pressure regulator recirculates unfiltered fuel from the filter chamber to the first fuel passage.

In a method for supplying fuel to a diesel engine, the fuel is pressurized. The fuel is regulated prior to filtering. The unfiltered fuel is recirculated to the inlet side of a fuel pump. The fuel is filtered.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
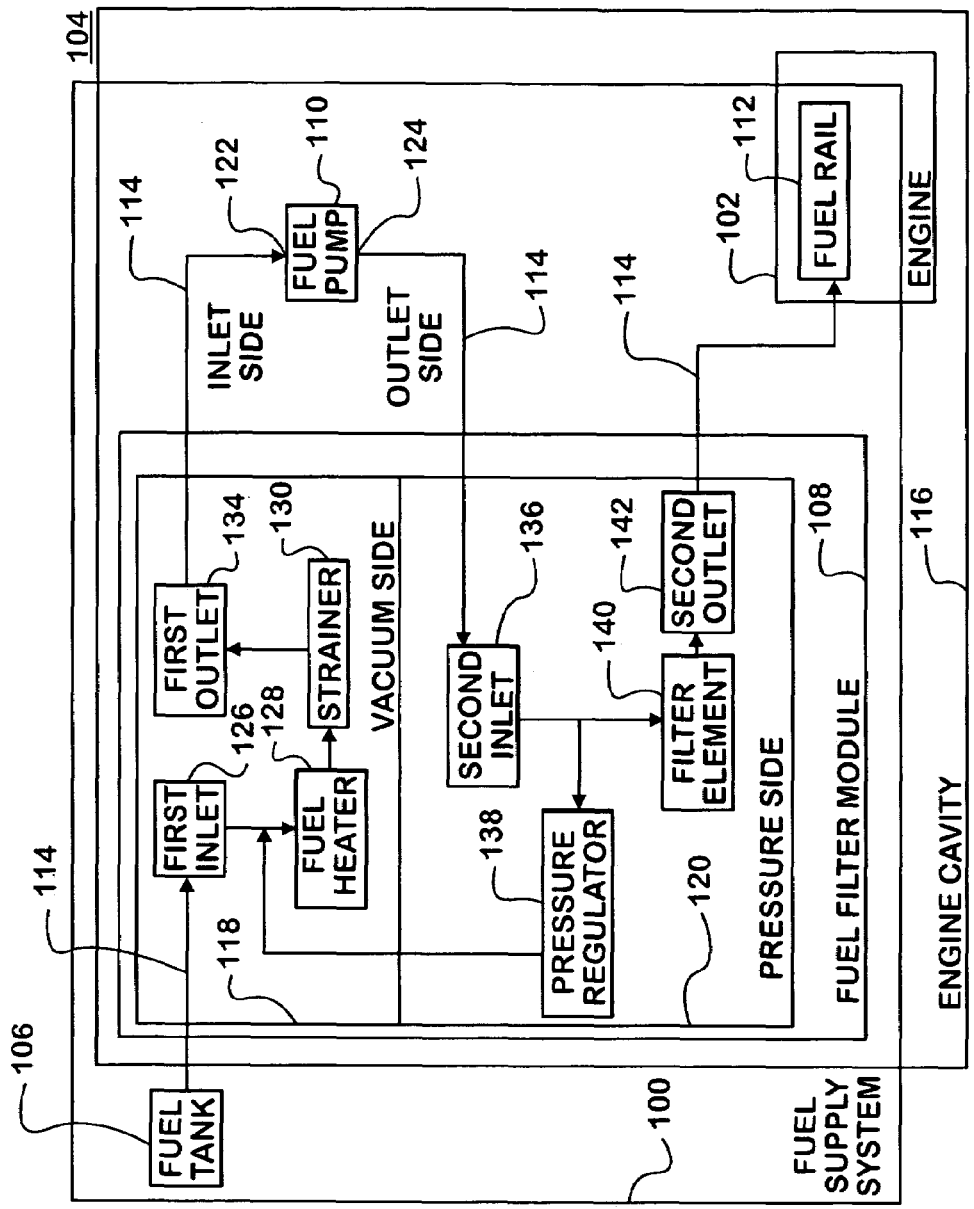
FIG. 1 is a block diagram of a fuel system for a diesel engine in a vehicle.
Figure 2:
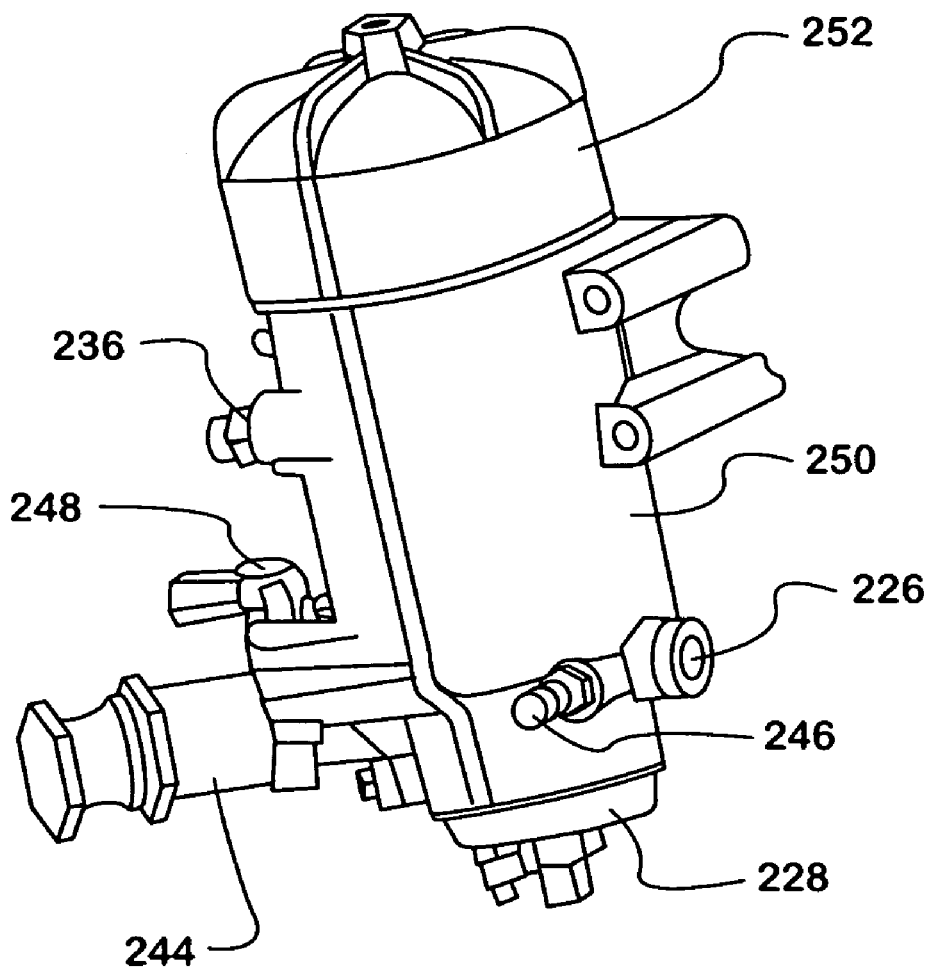
FIG. 2 is a front, perspective view of a fuel filter module for a fuel supply.
Figure 3:
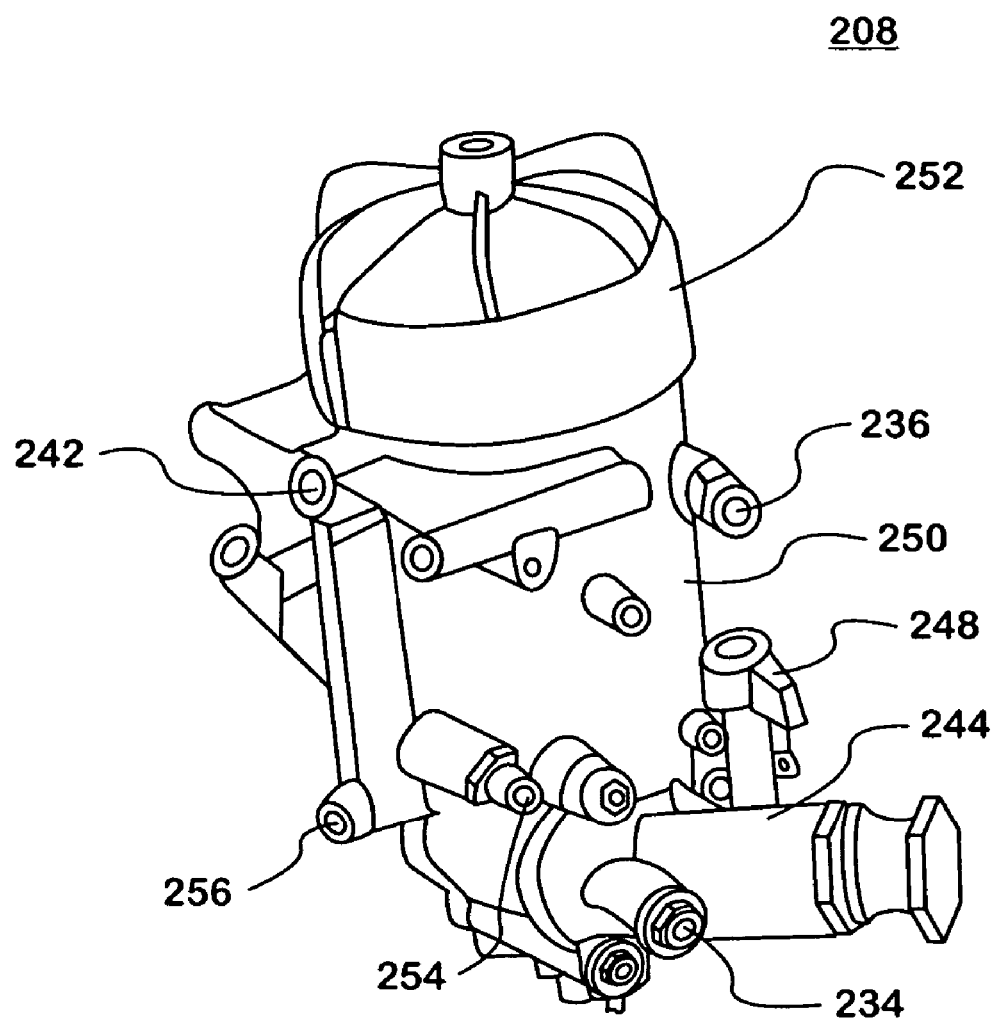
FIG. 3 is a back, perspective view of the fuel filter module of FIG. 2.
Figure 4:
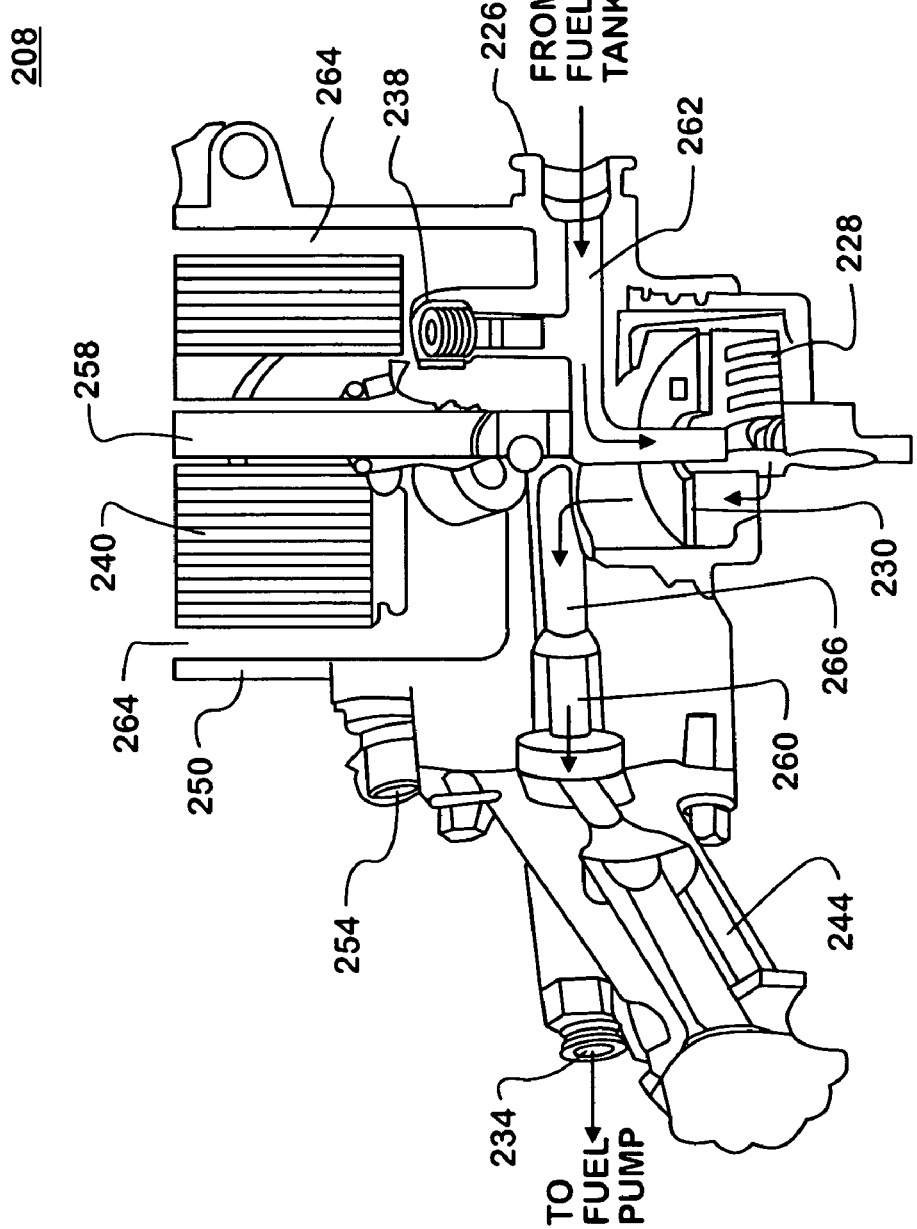
FIG. 4 is a front, cross-section view of the fuel filter module of FIG. 2.
Figure 5:
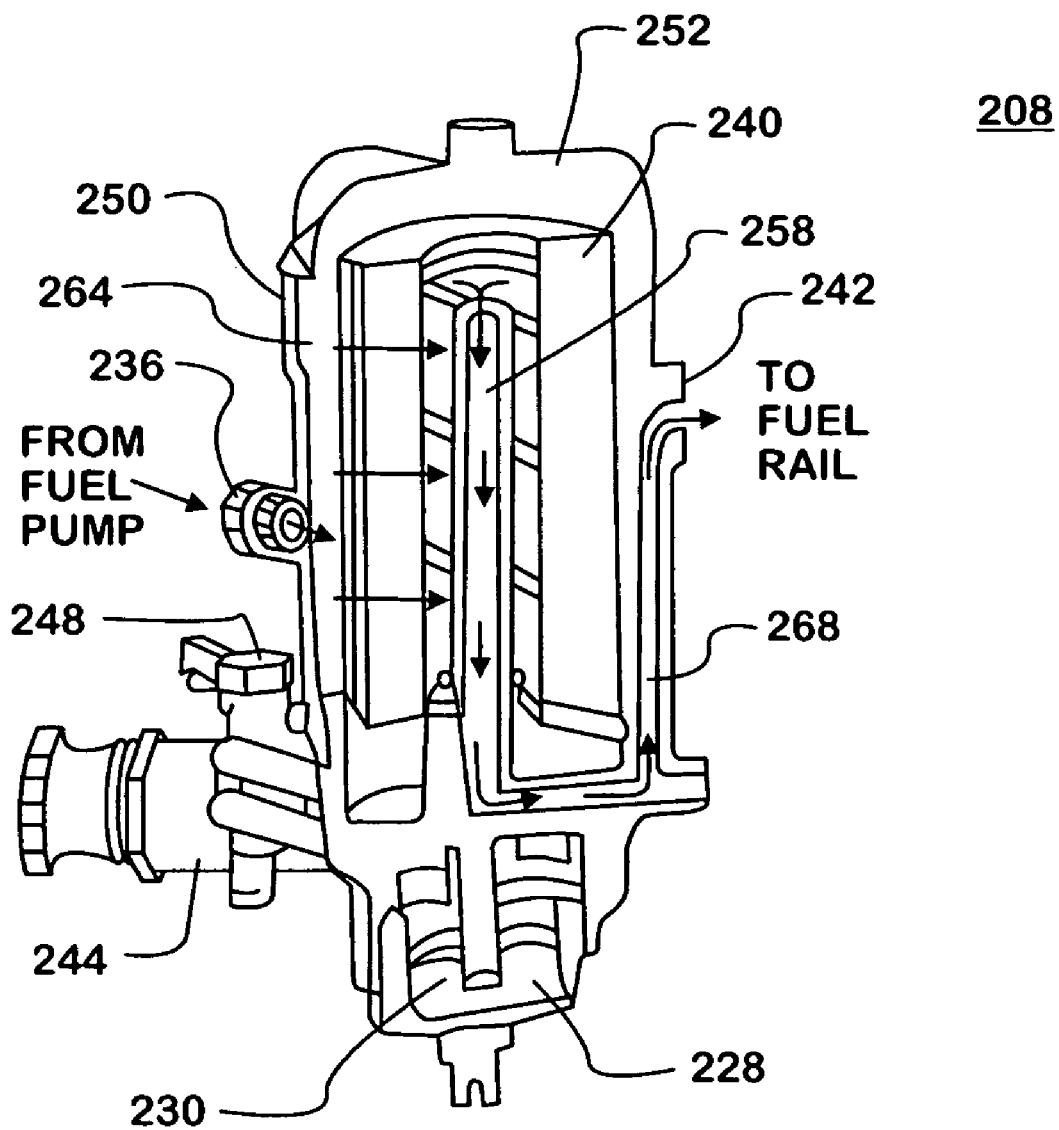
FIG. 5 a side, cross-section view of the fuel filter module of FIG. 2.

FIG. 1 is a block diagram of a fuel system 100 for a diesel engine 102 in a vehicle 104. The fuel system 100 has a fuel tank 106, a fuel filter module 108, a fuel pump 110, and a fuel rail 112 interconnected by a fuel line 114. The diesel engine 102 is disposed in an engine cavity 116 of the vehicle 104. The fuel tank 106 may be located in a portion of the vehicle that is outside the engine cavity 116. The fuel filter module 108, fuel pump 110, and fuel rail 112 may be inside the engine cavity 116. The fuel rail 112 may be mounted on the diesel engine 102. The fuel tank 106 and the fuel pump are connected to a vacuum side 118 of the fuel filter module 108. The fuel pump 110 is connected to a pressure side 120 of the fuel filter module 108. During engine operation, fuel from the fuel tank 106 flows to a vacuum side 118 of the fuel filter module 108. The vacuum side 118 may heat and may remove larger contaminants from the fuel. The fuel flows from the vacuum side 118 to an inlet side 122 of the fuel pump 110. The fuel pump 110 pressurizes the fuel. The fuel flows from an outlet side 124 of the fuel pump 110 to the pressure side 120 of the fuel filter module 108. The pressure side 120 of the fuel filter module 108 regulates the fuel pressure prior to filtering the fuel. The pressure side 120 provides filtered fuel to the fuel rail 112 and recirculates unfiltered fuel to the vacuum side 118. While a particular configuration is shown, the fuel system 100 may have other configurations including those with additional components.

The fuel pump 110 creates a vacuum on the inlet side 122. The vacuum causes fuel to flow from the vented fuel tank 106, through the vacuum side 118 of the fuel filter module 108, and into the inlet side 122 of the fuel pump. A vacuum includes pressures essentially less then than ambient pressure. The fuel pump 110 pressurizes the fuel to a pressure essentially greater than ambient pressure. The fuel pressure may be about 60 psi (0.4 MPa). Other fuel pressures may be used. The pressurized fuel flows from the fuel pump 110 through the pressure side 120 of the fuel filter module 108 to the fuel rail 112. The fuel pump 110 may be an electrical or mechanical pump.

The vacuum side 118 of the fuel filter module 108 receives fuel from the fuel tank 106 through a first inlet 126. The fuel flows through a fuel heater 128, a strainer 130, and a water separator 132. The fuel heater 128 may raise the fuel temperature by about 50° F. (10° C.). The fuel heater 128 may raise the fuel temperature by other amounts. The vacuum side 118 may not have a fuel heater. The strainer 130 removes larger size contaminants from the fuel. The strainer 130 may remove contaminants having a size larger than or equal to about 150 microns. Other contaminant sizes may be removed. The vacuum side 118 may have other components such as check valves, a priming pump, and the like. The fuel exits the vacuum side 118 through a first outlet 134 and flows to the inlet side 122 of the fuel pump 110.

The pressure side 120 of the fuel filter module 108 receives fuel from the outlet side 124 of the fuel pump 110 through a second inlet 136. Water may be separated from the fuel and drained from the pressure side 120 when the engine is not running. The fuel passes a pressure regulator 138 prior to passing through a filter element 140. The filter element 140 may remove contaminants having a size larger than or equal to about 15 microns. The filter element 140 may remove contaminants having a size larger than or equal to about 2 microns. Other contaminant sizes may be removed.

The pressure regulator 138 regulates the pressure of the fuel prior to the filter element 140. The pressure regulator 138 recirculates unfiltered fuel to the vacuum side 118 of the fuel filter module 108. The pressure regulator 138 may recirculate the unfiltered fuel to enter the fuel flow prior to the fuel heater 128 in the vacuum side 120. The recirculation of the fuel through the fuel heater 128 may improve the effectiveness of the fuel heater and may improve engine performance, especially during cold weather operation. The pressure regulator 138 may recirculate the unfiltered fuel to enter the fuel flow prior to the strainer 130 in the vacuum side 120. The pressure regulator 138 may reduce or relieve excess pressure when the filter element becomes plugged or reduces the fuel flow to the fuel rail 112.

The filter element 140 may have a longer service life when the fuel pressure is regulated prior to the filter element 140 (i.e., on the "dirty" side of the filter element 140). The regulation of fuel pressure prior to or on the dirty side of the filter element 140 permits only the fuel used by the fuel rail 112 to flow through the filter element 140. Some HEUI fuel injection systems are full flow, where some filtered fuel is returned to the fuel tank. These fuel injection systems can have fuel flow rates up to about 40 GPH (gallons per hour) or more. By filtering only the portion of fuel that is going to the fuel rail, the flow rate through the filter element may be reduced to about 20 GPH or less. This reduction in fuel flow through the filter element may extend service life of the filter element or may reduce the filter element size and cost.

FIGS. 2–5 show various views of a fuel filter module 208 for a fuel system in a diesel engine. The fuel filter module 208 has a housing 250 connected to a cap 252. The housing forms a first inlet 226, a fist outlet 234, a second inlet 236, and a second outlet 242. Each inlet 226 and 236 and each outlet 234 and 242 may have a connector or other connection device. The housing 250 and the cap 252 may be made of aluminum, plastic, like materials, or a combination thereof. The fuel filter module may have other configurations including those with additional components.

The fuel filter module 208 has a vacuum side and pressure side. The vacuum side may be connected to a fuel tank or other supply via a first inlet 226. The vacuum side may be connected to a fuel pump via a first outlet 234. The pressure side may be connected to the fuel pump via a second inlet 236. The pressure side may be connected to a fuel rail or other reservoir via a second outlet 242.

On the vacuum side of the fuel filter module 208, the housing 250 forms a first fuel passage 262 that connects to the first inlet 226. The first fuel passage 262 extends to a fuel heater 228, which is connected or integrated with a strainer 230. The housing 250 forms a second fuel passage 266 that extends from the strainer 230 to the first outlet 234. The fuel heater 228 may be electric and may operate on about 12 VDC. Other fuel heaters may be used including electric heaters using other power sources. The fuel filter module 208 may have a bowl in place of the fuel heater 228. The strainer 230 may remove contaminants from the fuel having a size essentially greater than or equal to about 150 microns. The strainer may remove contaminants having other sizes.

A priming pump 244 is mounted on the housing 250. The priming pump 244 is connected to the second fuel passage 266 between the strainer 230 and the first outlet 234. A check valve 260 is disposed in the second fuel passage 266 between the priming pump 244 and the strainer 230. The priming pump 244 may have a displacement of about 1 in$^3$ (16.4 cm$^3$). The priming pump 244 may have other displacements. The priming pump 244 may be manually operated.

On the pressure side of the fuel filter module 208, the housing 250 forms a filter chamber 264 that connects to the second inlet 236. A standpipe 258 is positioned along the centerline of the filter chamber 264. The standpipe 258 is open at the top and connects at the bottom to a third fuel passage 268 formed by the housing 250. The third fuel passage connects to the second outlet 242. A filter element 240 is disposed in the filter chamber 264 between the housing 250 and the standpipe 258. The cap 252 may be removed from the housing 250 for replacement of the filter element 240. The filter element 240 may have a gasket along an inside diameter to wipe the standpipe as the filter element 240 is removed and reinserted in the filter chamber 264.

The filter element 240 may remove about 98 percent of the contaminants from the fuel having a size larger than or equal to about 5 microns. The filter element 240 may remove about 95 percent of the contaminants from the fuel having a size larger than or equal to about 3 microns. The filter element 240 may remove other contaminant sizes.

A pressure regulator 238 is disposed in the housing 250. The pressure regulator 238 is connected to the filter chamber 264 and to the first fuel passage 262. The pressure regulator 238 regulates the pressure of fuel coming through the second inlet 236 from a fuel pump. The pressure regulator 238 regulates the fuel before the fuel passes through the filter element 240. The pressure regulator 238 recirculates unfiltered fuel to the first fuel passage 262 in the vacuum side.

During operation of the vacuum side, fuel flows from the first inlet 226 to the first outlet 234. The fuel flows from the first inlet 226, through the first fuel passage 262, to the fuel heater 228 and the strainer 230. The strainer 230 may remove larger contaminants from the fuel. The fuel flows from the strainer 230 through the second fuel passage 266, pass the check valve 260 and priming pump 244, and exits through the first outlet 234. The fuel heater 228 may raise the fuel temperature by about 50° F. (10° C.). The fuel heater 228 may raise the fuel temperature by other amounts.

During operation of the pressure side, fuel flows from the second inlet 236 to the second outlet 242. The fuel flows from the second inlet 226 into the filter chamber 264. The pressure regulator 238 regulates the fuel pressure and recirculates unfiltered fuel to the first fuel passage 262. The fuel flows through the filter element 240 and into the stand pipe 258. The filter element 240 may remove contaminants from the fuel that have a smaller size. The fuel flows through the standpipe, through the third fuel passage 268, and exits through the second outlet 242.

The fuel filter module 208 removes or separates water from the fuel. A water-in-fuel (WIF) sensor is mounted on the housing 250 and determines whether accumulated water in the fuel filter module exceeds a particular threshold. The threshold may be about 250 ml of water. Other thresholds may be used. A water drain 248 is connected to the housing. The water drain may be opened to remove the accumulated water.

The housing 250 may form a diagnostic port or valve 246 and a pressure sensor port 256. The diagnostic port 246 provides a vacuum connection, where air may be removed from the fuel system to start the engine. The pressure sensor port 256 provides a connection for a pressure sensor, which would measure the fuel pressure within the fuel filter module 208 after the fuel flows through the filter element (i.e., on the "clean" side of the fuel filter element 240). The pressure measured on the clean side of the filter element 240 may be compared to the pressure regulator setting of the pressure regulator 238 on the dirty side of the filter element 240. This comparison yields the pressure drop across the filter element 240 and may be used to gauge the serviceability of the filter element 240.

Figure 6:
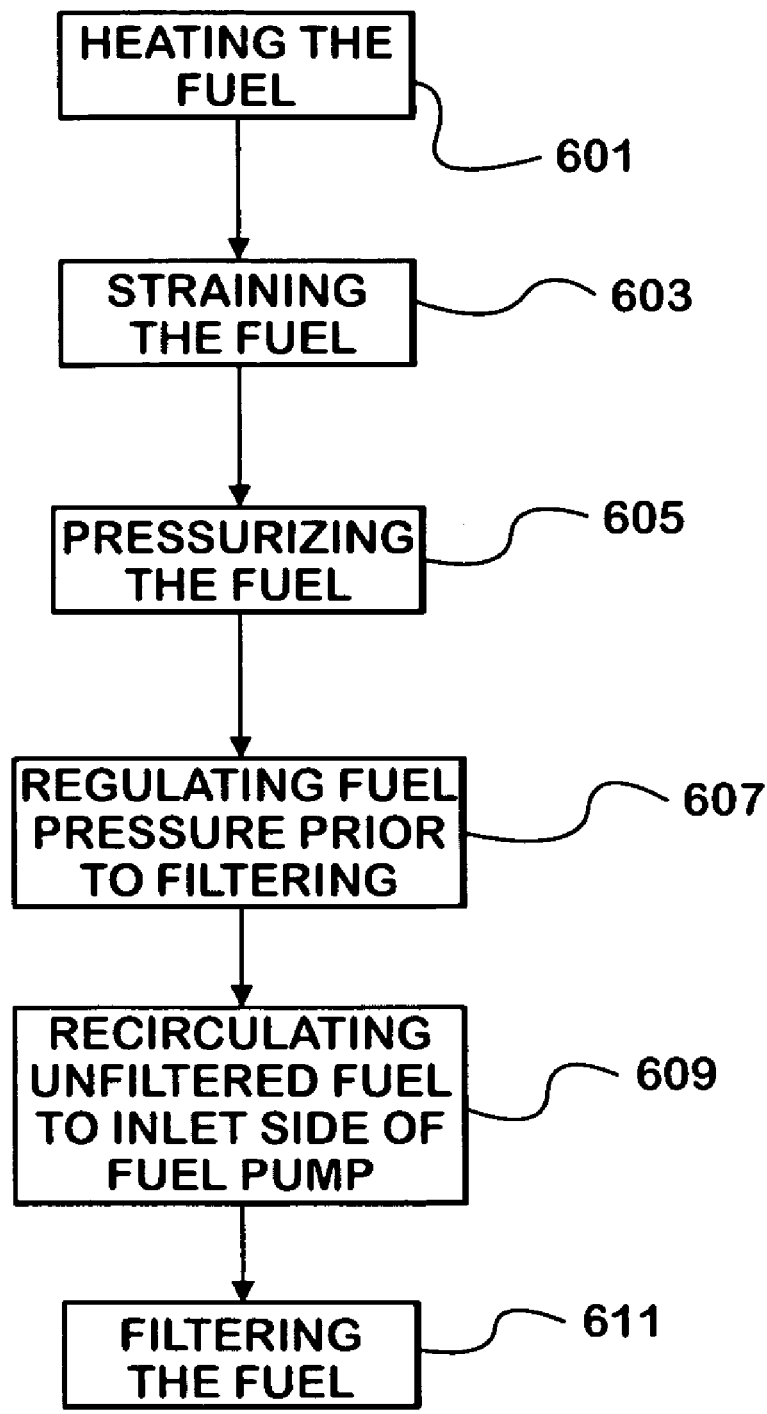
FIG. 6 is a flowchart of a method for supplying fuel to a diesel engine.

FIG. 6 is a flowchart of a method for supplying fuel to a diesel engine. The fuel is supplied from a fuel tank to a fuel rail on an engine as previously discussed.

In block 601, the fuel is heated by a fuel heater. The fuel heater may be electric and may operate at 12 VDC. The fuel heater may raise the fuel temperature up about 50° F. (10° C.). The fuel heater may increase the fuel temperature by other amounts.

In block 603, the fuel is strained to remove larger contaminants. The contaminants may have a size greater than or equal to about 150 microns. Other size contaminants may be strained.

In block 605, the fuel is pressurized by a fuel pump. The fuel pump may be electrical or mechanical. The fuel pressure may be about 60 psi (0.4 MPa). Other pressures may be used.

In block 607, the fuel pressure is regulated prior to filtering. A pressure regulator adjusts the pressure of the fuel to maintain a desired pressure for the fuel.

In block 609, the unfiltered fuel from a pressure regulator is recirculated to the inlet side of a fuel pump in the engine cavity of a vehicle. The pressure regulator may recirculate the unfiltered fuel from the pressure side to the vacuum side of a fuel filter module. The pressure regulator may recirculate the unfiltered fuel from a filter chamber in the pressure side to a fuel passage in the fuel filter module. The pressure regulator may recirculate the unfiltered fuel from the filter chamber to a fuel heater in the fuel filter module. The pressure regulator may recirculate the unfiltered fuel from a filter chamber in the pressure side to a strainer in the fuel filter module.

In block 611, the fuel is filtered to remove smaller contaminants. The contaminants may have a size greater than or equal to about 2 microns. The contaminants may have a size greater than or equal to about 15 microns. Other size contaminants may be strained. The fuel may be filtered to remove about 95 percent of the contaminants having a size greater than or equal to about 3 microns. The fuel may be filtered to remove about 98 percent of the contaminants having a size greater than or equal to about 5 microns. The fuel is filtered after the fuel pressure is regulated.

While various embodiments of the invention have been described, it will be apparent to those of ordinary skill in the art that other embodiments and implementations are possible within the scope of the invention. Accordingly, the invention is not to be restricted except in light of the attached claims and their equivalents.

What is claimed is:

1. A fuel system for a diesel engine, comprising:
   a fuel tank;
   a fuel pump having an inlet side and an outlet side, where the inlet side is connected to the fuel tank;

a fuel filter module having a pressure regulator and a filter element, where the filter element is connected to the outlet side of the fuel pump, where the pressure regulator is disposed between the outlet side of the fuel pump and the filter element, and where the pressure regulator recirculates unfiltered fuel to the inlet side of the fuel pump through a fuel path that excludes the fuel tank; and a fuel rail connected to the filter element.

2. The fuel system of claim 1, where the fuel filter module includes the fuel path and a pressure side, and where the fuel path is connected to the inlet side of the fuel pump.

3. The fuel system of claim 1, where the fuel path includes a fuel heater.

4. The fuel system of claim 1, where the fuel path includes a strainer.

5. The fuel system of claim 4, where the strainer removes contaminants from fuel, where the contaminants have a size greater than about 150 microns; and where the contaminants have a size equal to about 150 microns.

6. The fuel system of claim 1, where the filter element removes contaminants from fuel, where the contaminants have a size greater than about 2 microns; and where the contaminants have a size equal to about 2 microns.

7. The fuel system of claim 1, where the filter element removes contaminants from fuel, where the contaminants have a size greater than about 15 microns; and where the contaminants have a size equal to about 15 microns.

8. The fuel system of claim 1, where the filter element removes about 95 percent of contaminants having a size greater than about 3 microns, where the filter element removes about 95 percent of contaminants having a size equal to about 3 microns, where the filter element removes about 98 percent of contaminants having a size greater than about 5 microns, and where the filter element removes about 98 percent of contaminants having a size equal to about 5 microns.

9. A fuel filter module for a fuel system in a diesel engine, comprising:

a housing forming a vacuum side and a pressure side, where the vacuum side has a first inlet and a first outlet, where the pressure side has a second inlet and a second outlet, where the housing forms a first fuel passage connected to the first inlet, where the housing forms a second duel passage connected to the first outlet;

a strainer connected to the first and second fuel passages in the vacuum side;

a filter element disposed in a filter chamber formed by the housing in the pressure side, where the filter chamber is connected to the second inlet; and a pressure regulator connected to the filter chamber in the pressure side, where the pressure regulator is disposed between the second inlet and the filter element, where the pressure regulator is connected to the first fuel passage in the vacuum side, where the pressure regulator recirculates unfiltered fuel from the filter chamber to the first fuel passage.

10. The fuel filter module of claim 9, where the strainer removes contaminants from fuel, where the contaminants hive a size greater than about 150 microns; and where the contaminants have a size equal to about 150 microns.

11. The fuel filter module of claim 9, where the filter element removes contaminants from fuel, where the contaminants have a size greater than about 2 microns; and where the contaminants have a size equal to about 2 microns.

12. The fuel filter module of claim 9, where the filter element removes contaminants from fuel, where the contaminants have a size greater than about 15 microns; and where the contaminants have a size equal to about 15 microns.

\* \* \* \* \*